United States Patent
Beirinckx et al.

(10) Patent No.: US 9,562,601 B2
(45) Date of Patent: Feb. 7, 2017

(54) GEAR TRANSMISSION SYSTEM

(75) Inventors: Bert Beirinckx, Ekeren (BE); Joerg Litzba, Aachen (DE)

(73) Assignee: ZF Wind Power Antwerpen N. V., Lommel (BE)

( * ) Notice: Subject to any disclaimer, the term of this patent is extended or adjusted under 35 U.S.C. 154(b) by 13 days.

(21) Appl. No.: 14/232,954

(22) PCT Filed: Aug. 24, 2011

(86) PCT No.: PCT/EP2011/064557
§ 371 (c)(1),
(2), (4) Date: Jan. 15, 2014

(87) PCT Pub. No.: WO2013/026482
PCT Pub. Date: Feb. 28, 2013

(65) Prior Publication Data
US 2014/0174231 A1 Jun. 26, 2014

(51) Int. Cl.
*F16H 55/08* (2006.01)
(52) U.S. Cl.
CPC ....... *F16H 55/08* (2013.01); *F16H 2055/0893* (2013.01); *Y10T 74/19642* (2015.01)
(58) Field of Classification Search
CPC ................ F16H 55/08; F16H 2055/086; F16H 2055/176
USPC ................ 74/412 R, 462.457, 460, 468
See application file for complete search history.

(56) References Cited

U.S. PATENT DOCUMENTS

| 4,280,376 | A | * | 7/1981 | Rosen | 475/342 |
| 4,864,893 | A | * | 9/1989 | Hori | 475/341 |
| 4,942,781 | A | * | 7/1990 | Hori | 475/342 |
| 6,101,892 | A | * | 8/2000 | Berlinger et al. | 74/462 |
| 6,571,655 | B2 | * | 6/2003 | Tanaka | 74/462 |
| 6,632,154 | B2 | * | 10/2003 | Ushikoshi | 475/338 |
| 7,806,799 | B2 | | 10/2010 | Smook et al. | |
| 8,490,284 | B2 | * | 7/2013 | Huang et al. | 29/893.35 |
| 8,833,192 | B2 | * | 9/2014 | Helfer | 74/462 |

(Continued)

FOREIGN PATENT DOCUMENTS

| EP | 0 974 016 B1 | 3/2002 |
| GB | 250 429 | 4/1926 |

(Continued)

OTHER PUBLICATIONS

Japanese Office Action issued in corresponding Japanese Patent Application No. 2014-526392 mailed Feb. 24, 2015.

(Continued)

*Primary Examiner* — William Kelleher
*Assistant Examiner* — Zakaria Elahmadi
(74) *Attorney, Agent, or Firm* — Davis & Bujold, PLLC; Michael J. Bujold

(57) ABSTRACT

A gear transmission system (20) comprising at least a first cylindrical gear (21) and a second cylindrical gear (22). Each of the first and the second cylindrical gears (21, 22) comprise a plurality of teeth (23, 26). The teeth (23) of the first cylindrical gear (21) having a first tooth flank (24) for contacting a first tooth flank (27) of the teeth (26) of the second cylindrical gear (22) according to a predefined first contact line (30). The first tooth flanks (24, 27) of the teeth (23, 26) of each of the first and second cylindrical gears (21, 22) have a tooth shape and tooth properties determined by the predefined first contact line (30).

19 Claims, 6 Drawing Sheets

(56) References Cited

U.S. PATENT DOCUMENTS

| | | | |
|---|---|---|---|
| 2002/0134184 A1* | 9/2002 | Hawkins | 74/457 |
| 2005/0132836 A1* | 6/2005 | Colbourne | 74/457 |
| 2007/0207051 A1* | 9/2007 | Katz | 418/206.1 |
| 2014/0102233 A1* | 4/2014 | Hsu et al. | 74/412 R |
| 2014/0326092 A1* | 11/2014 | Tokozakura et al. | 74/325 |

FOREIGN PATENT DOCUMENTS

| | | | |
|---|---|---|---|
| JP | S428964 | A | 4/1967 |
| JP | H10331957 | A | 12/1998 |
| JP | 2001519013 | A | 10/2001 |
| JP | 2007525623 | A | 9/2007 |
| SI | 21810 | A | 12/2005 |

OTHER PUBLICATIONS

International Search Report Corresponding to PCT/EP2011/064557 mailed May 3, 2012.
Written Opinion Corresponding to PCT/EP2011/064557 mailed May 3, 2012.

* cited by examiner

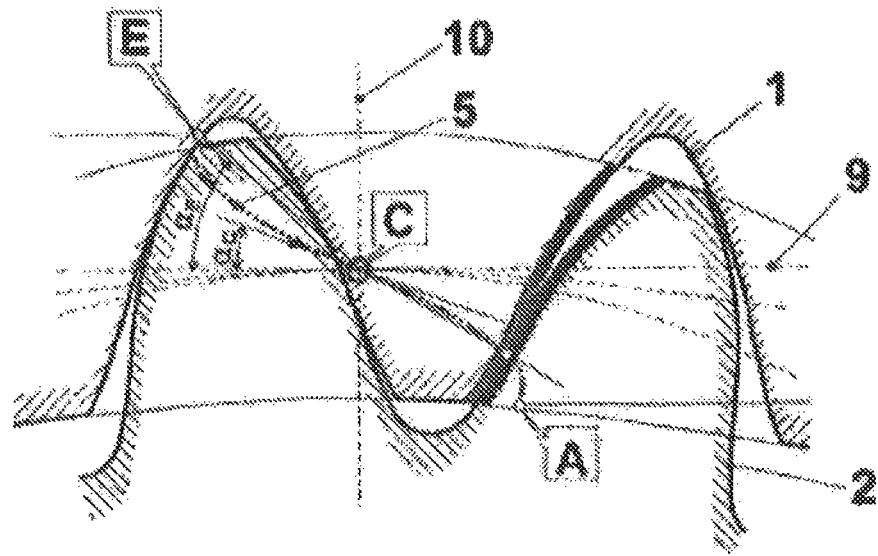
FIG. 1 – PRIOR ART
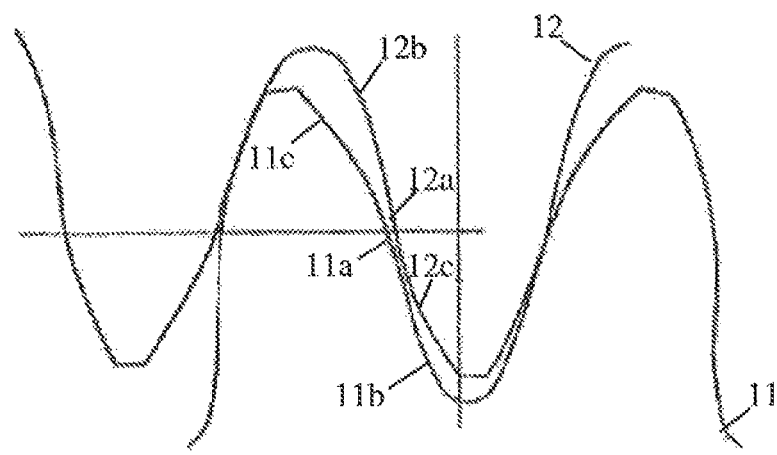
FIG. 2 – PRIOR ART

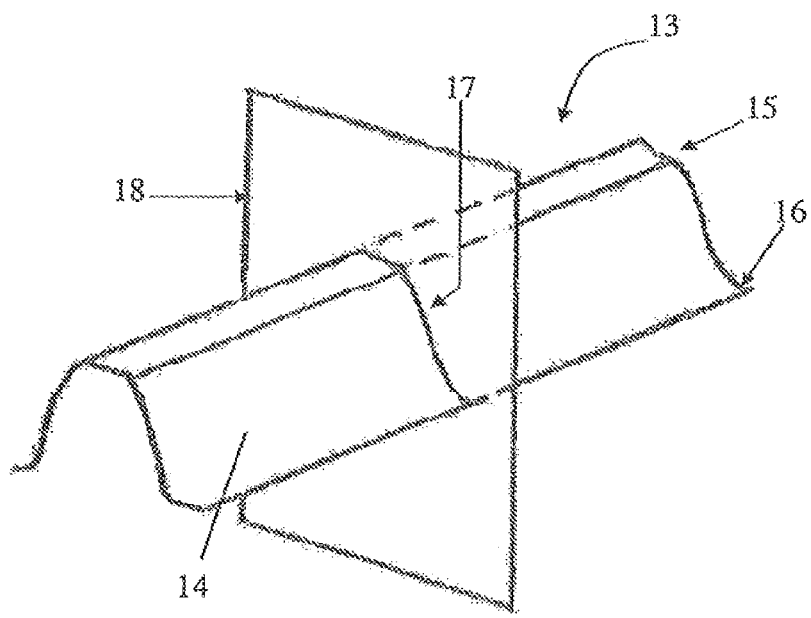
FIG. 3 – PRIOR ART
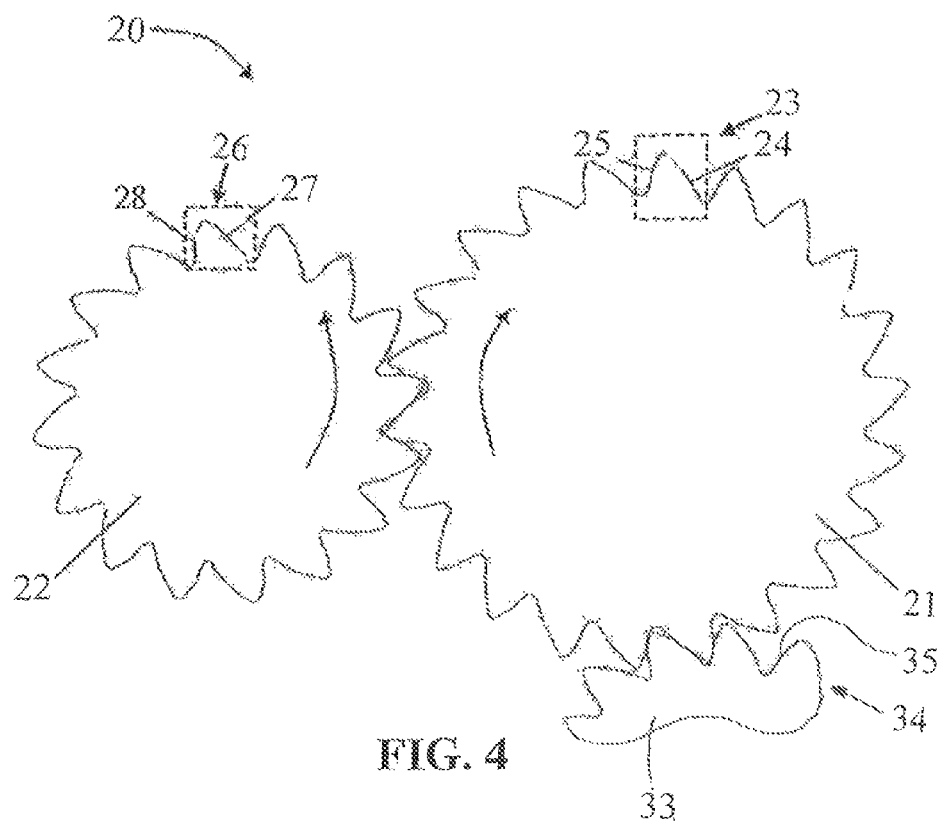
FIG. 4

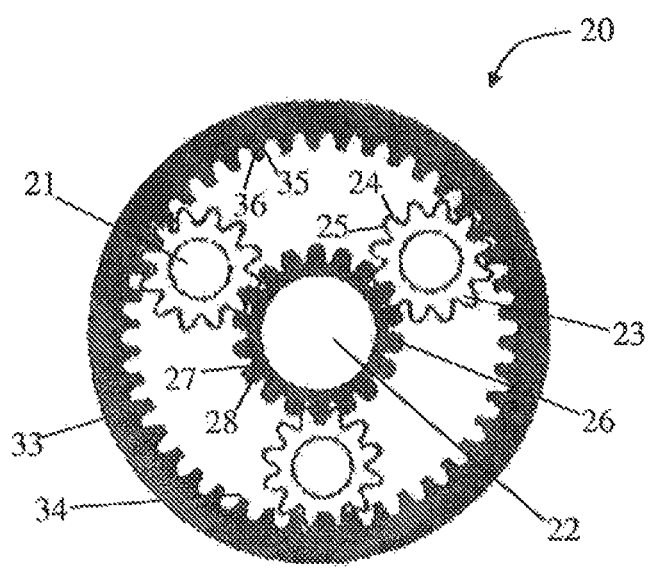
FIG. 8 – PRIOR ART

GEAR TRANSMISSION SYSTEM

This application is a National Stage completion of PCT/EP2011/064557 filed Aug. 24, 2011.

FIELD OF THE INVENTION

The present invention relates to a gear transmission system. More particularly, the present invention relates to gear transmission systems comprising at least two gears having teeth of which the tooth profile is determined by a predefined contact line.

BACKGROUND OF THE INVENTION

Gear transmission systems are used for transmitting motion by means of successively engaging teeth. During operation of a machine, one flank of a tooth of one gear meshes with one flank of a tooth of another gear. In order to obtain optimal meshing between the teeth of the gears, the tooth profile of the teeth of the gears is often optimized. In the past, tooth profile optimization has already extensively been studied in order to optimize tooth contact between meshing gears, which has led to different known tooth profile optimization methods.

For example, in SI 21810 Hlebanja et al. describe an internal gearing pair with S-gearing which comprises a gearwheel with internal teeth 1 and a gearwheel with external teeth 2 featuring lateral tooth profiles which conforms to a curved semi-symmetrical S-shaped fitting track or contact line 5 (see FIG. 1). The geometrical shape of the fitting track or contact line 5 is determined by the slope in its center $\alpha C=20°+/-2°$ and increasing curve factor between the center and the ends. Typical and predefined are the point A at the beginning of fitting, the point E at the end of fitting and the center of the fitting curve, which coincides with the kinematic pole C of the gearwheel pair. The distance between the starting point of fitting A and the final point of fitting E on one side, as well as the center 9 of the worm wheel gearing on the other corresponds to the module value. The distance of points A and E from the vertical axis of symmetry 10 of the gearwheels depends on the angle $\alpha E=38°+/-1°$, which results between the straight line E-C, or on the other side the straight line A-C with the axis of symmetry of the wormwheel gearing 9.

Another example is described in EP 0 974 016, which discloses a gearing system which includes a pair of gears (see FIG. 2). The tooth profile of the first gear 11 has three portions: a concave portion 11b lying within the dedendum of the first gear 11, a convex portion 11c lying within the addendum of the first gear 10 and a transition zone 11a disposed between the concave portion 11b and convex portion 11c. Similarly, the tooth profile of the mating gear 12 has three portions; a concave portion 12b lying within the dedendum of the mating gear 12, conjugate to the convex portion 11c of the tooth profile of the first gear 11; a convex portion 12c lying within the addendum of the mating gear 12, conjugate to the concave portion 11b of the tooth profile of the first gear 11; and a transition zone 12a disposed between the concave portion 12b and convex portion 12c. The pair of gears 11, 12 may be designed such that no contact between meshing teeth is made along the transition zones 11a, 12a.

A drawback of the above described methods is that they only allow optimizing one tooth contact, i.e. one flank of a tooth. Therefore, these methods may be less suitable to be used for idler gears, i.e. for gears which are interacting with two other gears. The teeth of idler gears on one side, also referred to as first flank, make contact with teeth of a first other gear and on the other side, also referred to as second flank, make contact with teeth of a second other gear. The first tooth flanks of the teeth of the idler gear may be subject to a different load distribution than the second tooth flanks of the teeth. For example, in case of a planetary gear unit comprising planet gears for mutual interaction with a sun gear and a ring gear, the tooth flanks of the planet gear teeth at the side of the sun gear are subject to a different load distribution than the tooth flanks of the planet gear teeth at the side of the ring gear.

Hence, when known tooth profile optimization methods as described above are performed on idler gears, they would only allow to optimize contact between a first flank of the teeth of the idler gear with teeth of another gear, and may thus still have drawbacks for the other tooth contact.

Disadvantages hereof may, for example, be that this may limit the allowable torque of the gear transmission systems, for example because of low tooth root strength. This may furthermore have disadvantages with respect to the dynamic behavior of the gear transmission systems.

In both the above described examples, the tooth profiles have a convex/concave geometry. Also examples are known of asymmetric tooth profiles. One example of such asymmetric tooth profiles and how to design these tooth profiles is described by Alexander Kapelevich in "Geometry and design of involute spur gears with asymmetric teeth. The method described in this paper is based on the following considerations. A first one is that for an external gearing a larger pressure angle is proposed for the drive tooth side but not for the coast tooth side. A second consideration is that the parameters of asymmetric gears are defined independently form any generating rack parameters. On the contrary, the choice of the generating rack parameters is based on results of the asymmetric gear synthesis. The generating rack parameters for the pinion and the gear are optimized independently and, as a rule, they are different.

Again, similar as the methods described above, this method only allows optimizing one tooth contact, i.e. one flank of a tooth, and may thus be less suitable for being used for idler gears.

SUMMARY OF THE INVENTION

The present invention provides a gear transmission system comprising at least a first and a second cylindrical gear. Each of the cylindrical gears comprises a plurality of teeth, the teeth of the first cylindrical gear having a first tooth flank for contacting or mating with a first tooth flank of the teeth of the second cylindrical gear according to a predefined first contact line. The first tooth flank of the teeth of each of the first and second cylindrical gears have a tooth profile, or in other words have a tooth shape and tooth properties, determined by the predefined first contact line.

According to embodiments of the invention, the predefined first contact line may be a continuous contact line, which means that it should meet the requirements of a continuous function.

The transmission gear system may be fully homokinetic, which means that, for example in case of a gear transmission system comprising a first and second cylindrical gear, the velocity of the first cylindrical gear, also referred to as the driven gear, is the same as the velocity of the second cylindrical gear, also referred to as the driving gear.

The contact line may vary for every sequential slice seen over the width of the gear in axial direction. Or, in other words, the contact line may change as a function of axial position.

According to embodiments of the invention, the predefined first contact line may be optimized for at least one tooth property chosen from, for example, tooth root stress, contact pressure, transmission error, tooth gear mesh stiffness or hydrodynamic oil film build-up. The tooth shape and tooth properties of the first tooth flanks of the teeth of each of the first and second cylindrical gears are then determined by the optimized first contact line.

The first contact line may comprise at least two contact line parts, each of the contact line parts being described by its own geometry equation or mathematical formula. According to embodiments of the invention, each of the contact line parts may have a same geometry equation structure or mathematical formula.

According to other embodiments, at least one of the contact line parts may have a different geometry equation structure or mathematical formula than the other contact line parts.

According to particular embodiments, the gear transmission system may furthermore comprise a third cylindrical gear having a plurality of teeth, the teeth of the third cylindrical gear having a first tooth flank for contacting a second tooth flank of the teeth of the first cylindrical gear according to a predefined second contact line. The first tooth flank of the teeth of the third cylindrical gear and the second tooth flank of the teeth of the first cylindrical gear may have a tooth shape and tooth properties determined by the second contact line.

The second contact line may be a continuous contact line, which means that it should meet the requirements of a continuous function.

The second contact line may comprise at least two contact line parts, each of the contact line parts being described by its own geometry equation or mathematical formula.

According to embodiments of the Invention, each of the contact line parts may have a same geometry equation structure or mathematical formula.

According to other embodiments of the invention, at least one of the contact line parts may have a different geometry equation or structure or mathematical formula than the other contact line parts.

The predefined second contact line may, according to embodiments of the invention, be optimized for at least one tooth property chosen from, for example, tooth root stress, contact pressure, transmission error, tooth gear mesh stiffness or hydrodynamic oil film build-up. The first tooth flank of the teeth of each of the third cylindrical gear and the second tooth flank of the teeth of the first cylindrical gear may have a tooth shape and tooth properties determined by the optimized second contact line.

According to embodiments of the invention, the first and second contact line may be optimized for at least one same tooth property.

According to other embodiments of the invention, the first and second contact line may be optimized for at least one different tooth property.

According to specific embodiments, the gear transmission system may be a planetary gear transmission system for a gearbox of a wind turbine wherein the first cylindrical gear may be a planetary gear, the second cylindrical gear may be a sun gear and the third cylindrical gear may be a ring gear.

The present invention also provides a method for determining a tooth profile, i.e. tooth shape and tooth properties of teeth of at least a first and a second cylindrical gear in a gear transmission system, the first and second cylindrical gears each comprising a plurality of teeth with a first and second tooth flank. The method comprises:

defining a contact line for the meshing of the first tooth flanks of the teeth of the first and second cylindrical gear, and from the predefined contact line determining the tooth shape and tooth properties of the teeth of the at least first and a second cylindrical gear.

The method may furthermore comprise, before determining tooth shape and tooth properties of the teeth of the at least first and second cylindrical gear, optimizing the predefined contact line for at least one tooth property.

According to embodiments, the present invention may provide a method for determining tooth shape and tooth properties of teeth of a first, second and third cylindrical gear in a gear transmission system, each of the first, second and third cylindrical gear comprising teeth with first and second tooth flank. The method comprises:

defining a first contact line for meshing of the first tooth flanks of the teeth of the first and second cylindrical gear, defining a second contact line for meshing of the first tooth flank of the teeth of the third cylindrical gear with the second tooth flank of the teeth of the first cylindrical gear, and from the predefined first and second contact line determining the tooth shape and tooth properties of the teeth of the at least first and a second cylindrical gear.

The method may furthermore comprise, before determining tooth shape and tooth properties of the teeth of the first, second and third cylindrical gears, optimizing the predefined first contact line and/or optimizing the predefined second contact line for at least one tooth property.

BRIEF DESCRIPTION OF THE DRAWINGS

It has to be noted that same reference signs in the different figures refer to same, similar or analogous elements.

FIG. 1 and FIG. 2 illustrate tooth profiles according to the prior art.

FIG. 3 illustrates the definition of tooth profile.

FIG. 4 illustrates a gear transmission system according to an embodiment of the Invention.

FIG. 8 illustrates a planetary gear transmission system as known in the prior art.

DETAILED DESCRIPTION OF THE PREFERRED EMBODIMENTS

Figure 5A:
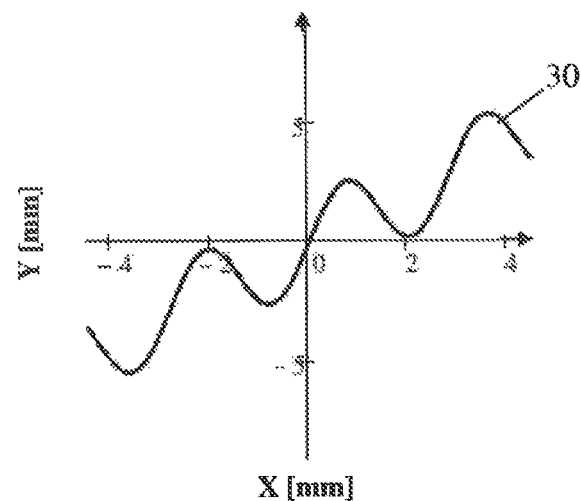
FIG. 5a and FIG. 5b illustrate a contact line according to different embodiments of the present invention.

In the description different embodiments will be used to describe the Invention. Therefore reference will be made to different drawings. It has to be understood that these drawings are intended to be non-limiting, the invention is only limited by the claims. The drawings are thus for illustrative purposes, the size of some of the elements in the drawings may be exaggerated for clarity purposes.

The term "comprising" is not to be interpreted as limiting the invention in any way. The term "comprising", used in the claims, is not intended to be restricted to what means is described thereafter; it does not exclude other elements, parts or steps.

The term "connected" as used in the claims and in the description has not to be interpreted as being restricted to direct connections, unless otherwise specified. Thus, part A being connected to part B is not limited to part A being in direct contact to part B, but also includes indirect contact between part A and part B, in other words also includes the case where intermediate parts are present in between part A and part B.

Not all embodiments of the Invention comprise all features of the invention. In the following description and claims, any of the claimed embodiments can be used in any combination.

The present invention provides a gear transmission system comprising at least two cylindrical gears having teeth with a tooth profile that is determined by a predefined contact line between the at least two gears of the gear transmission system. In other words, the present invention provides a gear transmission system having gears with teeth with a universal tooth contact mesh geometry characterized by a feature based contact line and/or surface shape.

A gear transmission system according to embodiments of the invention comprises at least a first and a second cylindrical gear. Each of the cylindrical gears comprises a plurality of teeth. The teeth of the first cylindrical gear have a first tooth flank for contacting, also referred to as mating or meshing with, a first tooth flank of the teeth of the second cylindrical gear according to a predefined first contact line. The first tooth flanks of the teeth of each of the first and second cylindrical gears have a tooth shape and tooth properties determined by the predefined first contact line. The predefined first contact line may be a continuous contact line. With continuous contact line is meant that it meets the requirements of a continuous function, with the function domain in radial direction.

With contact line, which may also be referred to as line of action or line of contact, is meant a path of contact between tooth flanks of teeth of mating or meshing gears. In other words, the contact line describes the meshing between teeth of gears.

According to embodiments of the Invention, the contact line may vary for every sequential slice seen over the width of the gear in axial direction. This means that the contact line may change as a function of axial position. Strictly spoken, instead of a contact line, one can call it a contact surface. This can lead to tooth flanks with very complex topologies. In that way, tooth flanks can be optimized in function of their width or, in other words, tooth properties can be varied in axial direction.

According to embodiments of the invention, the gear transmission system may be fully homokinetic which means that, for example in case of a gear transmission system comprising a first and second cylindrical gear, the velocity of the first cylindrical gear, also referred to as the driven gear, is the same as the velocity of the second cylindrical gear, also referred to as the driving gear.

Hence, the present invention provides a gear transmission system comprising at least two gears of which the teeth have a particular tooth profile, i.e. tooth shape and tooth properties, that is determined by a predefined contact line. This is contrary to existing tooth profiles for gears of a gear transmission system, for which first a tooth profile is defined and of which a particular contact line is a result of the gears meshing with each other instead of the shape and properties of the teeth being based on of being defined by the predefined contact line.

The novel and inventive aspect of embodiments of the present invention is thus the fact that the tooth profile, i.e. the shape and properties of the teeth of the gears, is based on a predefined contact line which thus determines the geometry of the tooth profile. This is clearly different from how tooth profiles are defined in the prior art up till now. By first defining and optionally optimizing the contact line, it is possible to obtain teeth with desired properties which were defined in beforehand.

Hereinafter, the invention will be described by means of different embodiments. It has to be understood that these embodiments are only for the ease of explaining the invention and are not intended to limit the Invention in any way.

As described above, the idea behind the present invention is to define a tooth profile for teeth of at least two gears in a gear transmission system, thereby starting from a predefined contact line. FIG. 3 schematically illustrates what is meant with the term "tooth profile". A tooth 13 comprises a tooth surface 14, a tooth tip 15 and a tooth root 16. With tooth profile 17 is meant the curve of Intersection of the tooth surface 14 and a plane or surface normal to the tooth surface 14, such as, according to FIG. 3, a transverse plane 18. According to embodiments of the Invention, the term tooth profile 17 is intended to include both tooth shape and tooth properties. Tooth properties may for example be but are not limited to, tooth root stress, contact pressure, transmission error, tooth gear mesh stiffness or hydrodynamic oil film build-up.

The idea of embodiments of the present invention can be applied to any suitable gear type known by a person skilled in the art and can be applied to internal gears, i.e. gears with internal teeth, as well as to external gears, i.e. gears with external teeth.

FIG. 4 illustrates a gear transmission system 20 comprising a first cylindrical gear 21 and a second cylindrical gear 22. The velocity of the first cylindrical gear 21, also referred to as the driven gear, may, according to embodiments of the Invention, be the same as the velocity of the second cylindrical gear 22, also referred to as the driving gear. In other words, the gear transmission system 20 may be homokinetic.

The first cylindrical gear 21 has a plurality of teeth 23 with a first tooth flank 24 and a second tooth flank 25. The second cylindrical gear 22 also has a plurality of teeth 26, also with a first tooth flank 27 and a second tooth flank 28. In the example given, the first tooth flank 24 of the first cylindrical gear 21 is for contacting the first tooth flank 27 of the second cylindrical gear 22. When the gear transmission system 20 is in operation, the first tooth flank 24 of the teeth 23 of the first cylindrical gear 21 will contact the first tooth flank 27 of the teeth 26 of the second cylindrical gear 22 according to a specific contact line. According to embodiments of the Invention, this contact line is first defined and the tooth profile, i.e. tooth shape and tooth properties, is then determined by the predefined contact line or, in other words, is a result of the predefined contact line.

The contact line may be defined based on required properties for the teeth 23, 26 of the gears 21, 22 for a particular application of the gear transmission system 20. According to embodiments of the invention, the contact line may be a continuous contact line, which means that it should meet the requirements of a continuous function with the function domain in radial direction.

After defining the contact line, this contact line may be optimized for at least one tooth property which may, for example, be one out of tooth root stress, contact pressure, transmission error, tooth gear mesh stiffness or hydrodynamic oil film build-up This leads to an optimized contact line which is then used to determine the tooth profile, i.e. tooth shape and tooth properties, of the teeth 23, 26 of the cylindrical gears 21, 22 of the gear transmission system 20. Optimizing tooth properties can have different meanings depending on the kind of tooth property. For example, optimizing tooth root stress may mean reducing (operational and/or maximum)) tooth root stress. Optimizing contact pressure may mean reducing (operational and/or maximum) contact pressure. Optimizing transmission errors may mean reducing negative effects of transmission errors. Optimizing oil film build-up may mean optimizing hydrodynamic lubrication conditions.

Figure 5B:
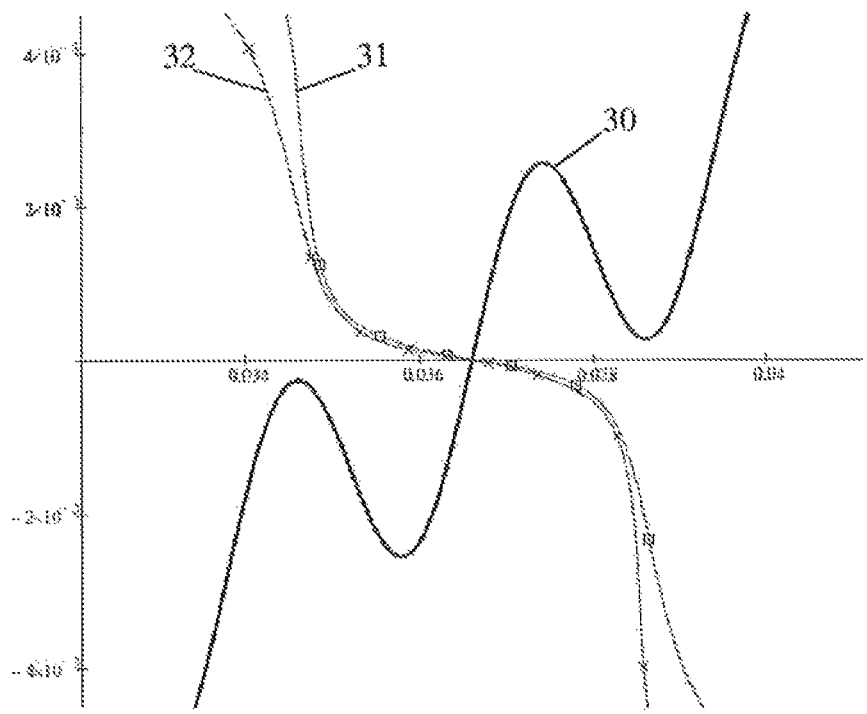

The contact line 30 is thus, as described above, first defined and optionally optimized by taking into account required tooth properties for, for example, a gear transmission system 20 for particular applications. An example of a predefined contact line 30 is illustrated in FIG. 5a and FIG. 5b. According to the example given in FIG. 5a and FIG. 5b the contact line 30 may be a wave-like curve. However, according to other embodiments of the invention, the predefined contact line 30 may have any other suitable shape required to obtain teeth 23, 26 with required properties for the gear transmission system 20 for a particular application (see further). The shape of the contact line 30 may depend on the required properties necessary for a particular application of the gear transmission system 20. The contact line 30 illustrated in FIG. 5a and FIG. 5b is a continuous curve which means that it meets the requirements of a continuous function with the function domain in radial direction, i.e. in the x-direction.

From the predefined contact line 30, the tooth profile, i.e. shape and properties, of the teeth 23, 26 of the first and second cylindrical gears 21, 22 is then generated. This may be done by mathematical techniques known by a person skilled in the art. FIG. 5b shows the curve 31 of the first tooth flank of the teeth of first gear 21 and the curve 32 of first tooth flank of the teeth of the second gear 22 together with the contact line 30.

Hence, once the contact line 30 is defined and optionally optimized, the tooth profile, i.e. tooth shape and tooth properties, result from this contact line 30.

It has to be understood that the invention is not about the resulting tooth profile per se, as tooth profiles resulting from the principle of this invention can be any tooth profile known by a person skilled in the art. The idea behind the present invention is that the Invention makes it possible to generate any suitable tooth shape starting from a contact line 30 that is adapted to result in teeth having tooth profiles with desired properties such that mating or meshing between the two cylindrical gears 21, 22 can occur under the best possible circumstances for a particular application.

The predefined contact line 30 may be described by means of a geometry equation.

According to embodiments of the invention, the predefined contact line 30 may comprise or may be built up out of at least two contact line parts, each of the contact line parts being described by its own geometry equation. According to embodiments of the invention and of which an example is illustrated in FIG. 5a and FIG. 5b, each of the at least two contact line parts may have a same geometry equation structure, or in other words may have a geometry equation or mathematical formula with a same structure. This means that, in such cases, the contact line 30 can be described by means of one geometry equation, which in the example of FIG. 5a and FIG. 5b is:

$$f(x) = \left(\frac{\sin(10x)}{2.5} + x\right) \qquad \text{Eq. (1)}$$

According to other embodiments of the Invention, at least one of the at least two contact line parts may have a different equation structure than the other contact line parts (see further).

Figure 6A:
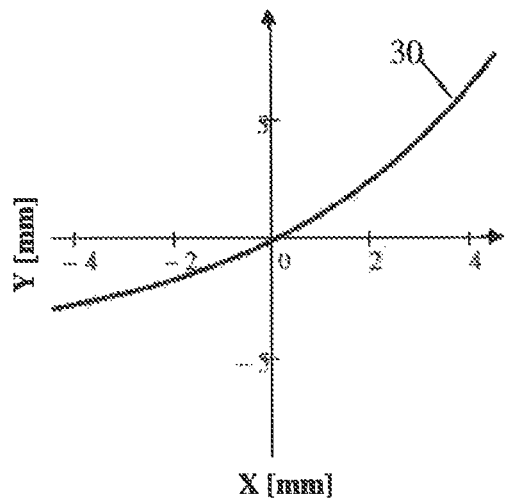
FIG. 6a and FIG. 6b illustrate a contact line according to different embodiments of the present invention.
Figure 6B:
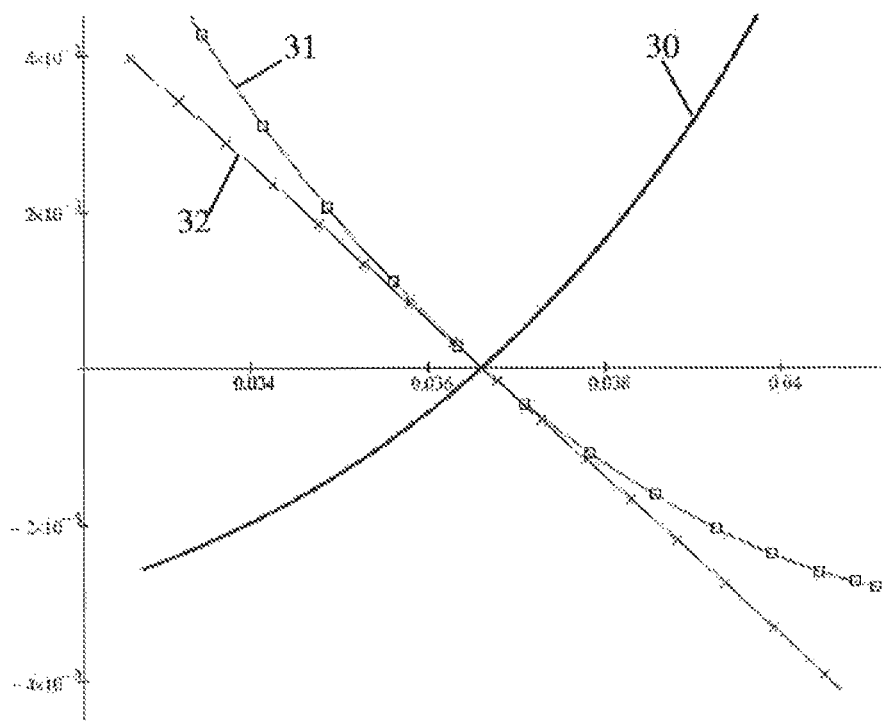

As already mentioned above, the contact line 30 may have any suitable shape known by a person skilled in the art. Another example of a contact line 30 according to embodiments of the invention is illustrated in FIG. 6a and FIG. 6b where the contact line 30 is an exponential curve. Also in this example, the different contact line parts in the contact line 30 have a same geometry equation structure corresponding with Eq. (2):

$$f(x) = (e^x - 1) \qquad \text{Eq. (2)}$$

Again it has to be understood that FIG. 6a and FIG. 6b show only an example of a contact line 30 for determining tooth geometry for gears 21, 22 in a gear system 20 according to embodiments of the Invention and is not intended to limit the invention in any way.

According to further embodiments, as already mentioned above, each of the at least two contact line parts of the contact line 30 may have a different geometry equation structure. An example hereof is illustrated in FIG. 7a and FIG. 7b, wherein a first contact line part 30a of the contact line 30 meets the following equation:

$$f(x) = \tan\left(\frac{\pi}{2} - \alpha_n\right)x \qquad \text{Eq. (3)}$$

wherein $\alpha_n$ is 30 degrees,
and wherein a second part 30b and third part 30c of the contact line 30 meet the equation of a spline (smooth piecewise-polynomial function).

Figure 7A:
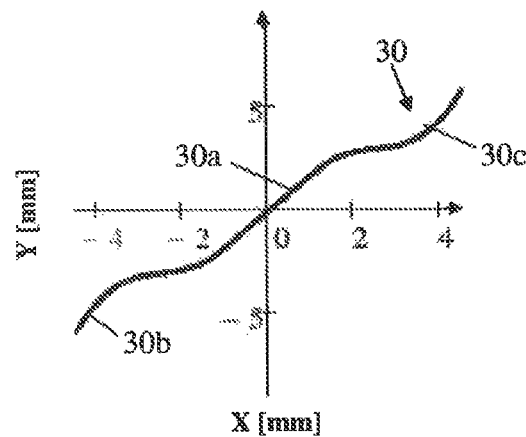
FIG. 7a and FIG. 7b illustrate a contact line according to different embodiments of the present invention.
Figure 7B:
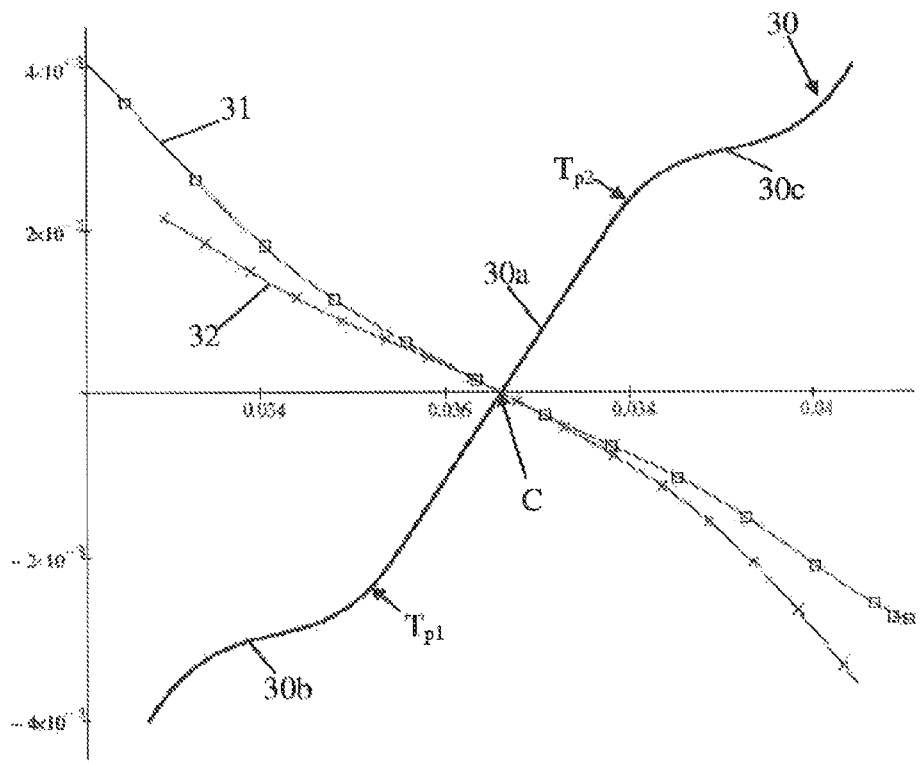

Such contact line 30 comprising parts 30a, 30b, 30c with different geometry equation structures as illustrated in FIG. 7a and FIG. 7b may also be referred to as a compound contact line. In between different neighboring parts 30a and 30b resp. 30a and 30c there are transition points. The transition point between such neighboring parts 30a and 30b resp. 30a and 30c may be located anywhere along the contact line 30 and can but does not necessarily have to coincide with the pole C, which is the Intersection point of the contact line 30 with the x-as. In the example of FIG. 7a and FIG. 7b, the transition points $T_{p1}$ and $T_{p2}$ do not coincide with the pole C.

According to further embodiments of the invention, the gear transmission system 20 may, instead of two cylindrical gears 21, 22 as illustrated in FIG. 4, also comprise three cylindrical gears. In other words, the gear transmission system 20 may also be an idler gear system 20. For example, the first and second cylindrical gear 21, 22 may be external gears or gears with external teeth 23, 26, while the third cylindrical gear 33 may be an internal gear or a gear with internal teeth 34. A specific example of such gear system 20 may, for example, be a planetary gear system 20 which is well known for a person skilled in the art and of which an example is given in FIG. 8. In this example, the first cylindrical gear 21 may be a planetary gear, the second cylindrical gear 22 may be a sun gear and the third cylindrical gear 33 may be a ring gear. The planetary gear transmission system 20 may, for example, be a planetary gear transmission system 20 for a gearbox of a wind turbine.

Similar as in the example illustrated in FIG. 4 the teeth 23, 26 of the first and second cylindrical gears 21, 22 have a first tooth flank 24, 27 and a second tooth flank 25, 28. The first tooth flank 24 of the first cylindrical gear 21 is for contacting the first tooth flank 27 of the second cylindrical gear 22. The teeth 34 of the third cylindrical gear 33 (only partially shown in FIG. 4) also have a first tooth flank 35 and a second tooth flank 36. The first tooth flank 35 of the teeth 34 of the third cylindrical gear 33 is for contacting the second tooth flank 25 of the first cylindrical gear 21.

According to these embodiments, both the first and second tooth flank 24, 25 of the first cylindrical gear 21 may have to be optimized for obtaining a good meshing contact with both the second cylindrical gear 22 and the third cylindrical gear 33. When the gear transmission system 20 is in operation, the first tooth flank 24 of the teeth 23 of the first cylindrical gear 21 will contact the first tooth flank 27 of the teeth 26 of the second cylindrical gear 22 according to a first contact line 30 and the second tooth flank 25 of the teeth 23 of the first cylindrical gear 21 will contact the first tooth flank 35 of the teeth 34 of the third cylindrical gear 33 according to a second contact line 30. Again, according to the invention, the first and second contact lines 30 are first defined and then the tooth profile, i.e. tooth shape and tooth properties, of the teeth 23, 26, 34 of the first, second and third cylindrical gears 21, 22, 33 is determined by the predefined contact lines 30.

First, the first contact line 30 may be determined. The contact line 30 may be defined based on required properties for the teeth 23, 26 of the first and second cylindrical gears 21, 22 for a particular application of the gear transmission system 20. The first contact line 30 may thereby be optimized for at least one tooth property such as, for example but not limited to, tooth root stress, contact pressure, transmission error or hydrodynamic oil film build-up. From the predefined first contact line 30, the tooth profile, i.e. shape and properties, of the first tooth flanks 24, 27 of the teeth 23, 26 of the first and second cylindrical gears 21, 22 is determined.

Then a second contact line 30 may be determined. Similar as for the first contact line 30, the second contact line may be defined based on required properties for the teeth 23, 34 of the first and third cylindrical gears 21, 33 for a particular application of the gear transmission system 20. The second contact line 30 may thereby be optimized for at least one tooth property such as, for example but not limited to, tooth root stress, contact pressure, transmission error or hydrodynamic oil film build-up. From the predefined second contact line 30, the tooth profile, i.e. shape and properties, of the second tooth flank 25 of the teeth 23 of the first cylindrical gear 21 and the first tooth flank 35 of the teeth 34 of the third cylindrical gear 33 is determined.

According to embodiments of the invention, the first and second contact lines 30 may be optimized for at least one same tooth property. According to other embodiments of the invention, the first and second contact lines 30 may be optimized for at least one different tooth property. The first and second contact lines 30 do also not have to be optimized for a same number of tooth properties.

In the way described above, the tooth profile, i.e. shape and properties, of the teeth 23, 26, 34 of the three cylindrical gears 21, 22, 33 can be determined for obtaining optimal contact between teeth 23, 26, 34 of these gears 21, 22, 33.

An advantage of the principle of embodiments of the present invention is that, in case of a gear transmission system 20 comprising three cylindrical gears 21, 22, 33, the tooth flanks 24, 25 of the teeth 23 of the cylindrical gear 21 which is in contact with both other gears 22, 33 can be optimized independently and separately.

In that way, different load distributions which may occur on the first and second tooth flank 24, 25 of the teeth 23 of the first cylindrical gear 21 can be taken into account. Consequently, the allowable torque of the gear transmission system 20 according to embodiments of the invention is not limited, which is advantageous for the dynamic behavior of the gear transmission system 20.

The first and second contact lines 30 may be described by means of a geometry equation and may comprise or may be built up out of at least two contact line parts 30a, 30b, 30c, each of the contact line parts 30a, 30b, 30c having its own geometry equation structure or mathematical formula. According to embodiments of the invention, the contact line parts 30a, 30b, 30c of at least one of the first and second contact line 30 may have a same geometry equation structure or mathematical formula. According to other embodiments, the contact line parts 30a, 30b, 30c of at least one of the first and second contact lines 30 may have different geometry equation structures or mathematical formula. According to embodiments of the invention, the first and second contact lines 30 may comprise a same number of contact line parts 30a, 30b, 30c or may comprise a different number of contact line parts 30a, 30b, 30c.

The principle according to embodiments of the Invention can be applied to obtain any tooth profile 17, i.e. teeth 23, 26 with any shape and any required tooth property starting from a contact line 30 having any shape and optimized for obtaining such tooth profile 17.

The invention claimed is:

1. A gear transmission system (20) comprising:
   at least a first cylindrical gear (21) having an axial width in an axial direction and a second cylindrical gear (22) having an axial width in the axial direction,
   each of the cylindrical gears (21, 22) comprising a plurality of teeth (23, 26), the plurality of teeth of the first and the second cylindrical gears each have a first tooth flank (24, 27) and a second tooth flank (25, 28), and
   in a transverse plane at a first axial position in the axial direction, the first tooth flanks of the teeth (23) of the first cylindrical gear (21) contact the first tooth flanks (27) of the teeth (26) of the second cylindrical gear (22) according to a predefined first contact line (30),
   wherein the first tooth flank (24, 27) of each of the plurality of teeth (23, 26) of each of the first and the second cylindrical gears (21, 22) have a first flank shape and first flank properties being determined by the predefined first contact line (30),
   the second tooth flank (25, 28) of each of the plurality of teeth (23, 26) of each of the first and the second cylindrical gears (21, 22) having a second flank shape and second flank properties being determined by a predefined second contact line (30),
   the predefined first contact line (30) being different from at least the second predefined contact, and
   at least one of the first flank shape and the first flank properties varies in the axial direction along the axial width of the first flank.

2. The gear transmissions system (20) according to claim 1, wherein the predefined first contact line (30) is a continuous contact line.

3. The gear transmission system (20) according to claim 1, wherein the gear transmission system (20) is fully homokinetic.

4. The gear transmission system (20) according to claim 1, wherein at least one of the first flank shape and the first flank properties of the first tooth flank varies as a function of the axial position over the axial width of the cylindrical gear (21, 22) such that at least one of the first flank shape and the first flank properties varies along the axial width of the first flank.

5. The gear transmission system (20) according to claim 1, wherein the predefined first contact line (30) is optimized for at least one tooth property, and the first tooth flanks (24, 27) of the teeth (23, 26) of each of the first and the second cylindrical gears (21, 22) have a tooth shape and tooth properties determined by the optimized first contact line (30).

6. The gear transmission system (20) according to claim 1, wherein the predefined first contact line (30) comprises at least two contact line parts (30a, 30b, 30c), and each of the at least two contact line parts (30a, 30b, 30c) has its own geometry equation.

7. The gear transmission system (20) according to claim 1, wherein the predefined first contact line (30) comprises at least two contact line parts (30a, 30b, 30c), and each of the at least two contact line parts (30a, 30b, 30c) has a same geometry equation structure.

8. The gear transmission system (20) according to claim 6, wherein at least one of the at least two contact line parts (30a, 30b, 30c) has a different geometry equation structure than the other of the at least two contact line parts (30a, 30b, 30c).

9. The gear transmission system (20) according to claim 6, wherein the gear transmission system (20) further comprises a third cylindrical gear (33) having a plurality of teeth (34), the teeth (34) of the third cylindrical gear (33) have a first tooth flank (35) for contacting the second tooth flank (25) of the teeth (23) of the first cylindrical gear (21) in a transverse plane at a position in the axial direction according to the predefined second contact line (30), the first tooth flank (35) of the teeth (34) of the third cylindrical gear (33) and the second tooth flank (25) of the teeth (23) of the first cylindrical gear (21) both have a tooth shape and tooth properties determined by the predefined second contact line (30).

10. The gear transmissions system (20) according to claim 9, wherein the predefined second contact line (30) is a continuous contact line.

11. The gear transmission system (20) according to claim 9, wherein the predefined second contact line (30) comprises at least two contact line parts (30a, 30b, 30c), each of the at least two contact line parts (30a, 30b, 30c) defines its own geometry equation.

12. The gear transmission system (20) according to claim 2, wherein each of the at least two contact line parts (30a, 30b, 30c) has a same geometry equation structure.

13. The gear transmission system (20) according to claim 11, wherein at least one of the at least two contact line parts (30a, 30b, 30c) has a different geometry equation structure than the other of the at least two contact line parts (30a, 30b, 30c).

14. The gear transmission system (20) according to claim 9, wherein the predefined second contact line (30) is optimized for at least one tooth property, and the first tooth flank (35) of the teeth (34) of the third cylindrical gear (33) and the second tooth flank (25) of the teeth (23) of the first cylindrical gear (21) have a tooth shape and tooth properties determined by the optimized second contact line (30).

15. The gear transmission system (20) according to claim 14, wherein the predefined first and the predefined second contact lines (30) are optimized for at least one same tooth property.

16. The gear transmission system (20) according to claim 14, wherein the predefined first and the predefined second contact lines (30) are optimized for at least one different tooth property.

17. The gear transmission system (20) according to claim 9, wherein the gear transmission system (20) is a planetary gear transmission system for a gearbox of a wind turbine and the first cylindrical gear (21) is a planetary gear, the second cylindrical gear (22) is a sun gear and the third cylindrical gear (33) is a ring gear.

18. The gear transmission system (20) according to claim 1, wherein the at least one tooth property is at least one of:
tooth root stress,
contact pressure,
transmission error,
tooth gear mesh stiffness, or
hydrodynamic oil film build-up.

19. A gear transmission system (20) comprising:
at least a first cylindrical gear (21), a second cylindrical gear (22), and a third cylindrical gear (33) each being aligned in an axial direction;
each of the first, the second and the third cylindrical gears (21, 22) comprising a plurality of teeth (23, 26),
the plurality of teeth (23) of the first cylindrical gear (21) having a first tooth flank (24) for contacting a first tooth flank (27) of the teeth (26) of the second cylindrical gear (22) in a first lateral plane according to a predefined first contact line (30),
the plurality of teeth (23) of the first cylindrical gear (21) having a second tooth flank (24) for contacting a second tooth flank (27) of the teeth (26) of the second cylindrical gear (22) in the first lateral plane according to a predefined second contact line (30), and
the plurality of teeth (34) of the third cylindrical gear (33) have a first tooth flank (35) for contacting a second tooth flank (25) of the plurality of teeth (23) of the first cylindrical gear (21) in either the first or a second lateral plane according to a predefined second contact line (30), the predefined first and the predefined second contact lines are variable depending on an axial position of at least the first and the second lateral planes along an axial width of the first, the second and the third cylindrical gears in the axial direction;
wherein the first tooth flanks (24, 27) of the plurality of teeth (23, 26) of each of the first and the second cylindrical gears (21, 22) have in the first lateral plane a first flank shape and first flank properties determined by the predefined first contact line (30);
the first tooth flank (35) of the plurality of teeth (32) of the third cylindrical gear (33) and the second tooth flank (25) of the plurality of teeth (23) of the first cylindrical gear (21) have a second flank shape and second flank properties in the axial position of at least the first and the second lateral planes determined by the predefined second contact line (30) such that at least one of the second flank shape and second flank properties are different from a respective one of at least one of the first flank shape and first flank properties; and
the tooth properties determined by the predefined first and the second contact lines comprising at least one of:
tooth root stress, contact pressure,
transmission error,
tooth gear mesh stiffness, and
hydrodynamic oil film build-up.

* * * * *